United States Patent [19]

Dluzik

[11] Patent Number: 5,660,726
[45] Date of Patent: Aug. 26, 1997

[54] RETURN FILTER FOR FLUIDS

[75] Inventor: Klaus Dluzik, Hambrücken, Germany

[73] Assignee: ARGO GmbH für Fluidtechnik, Kraichtal/Menzingen, Germany

[21] Appl. No.: 530,133
[22] PCT Filed: Mar. 5, 1994
[86] PCT No.: PCT/EP94/00656
 § 371 Date: Sep. 26, 1995
 § 102(e) Date: Sep. 26, 1995
[87] PCT Pub. No.: WO94/22550
 PCT Pub. Date: Oct. 13, 1994

[30] Foreign Application Priority Data

Mar. 30, 1993 [DE] Germany ............ 43 10 234.4

[51] Int. Cl.⁶ ................................................ B01D 35/01
[52] U.S. Cl. ............... 210/130; 210/433.1; 210/436; 210/453; 210/493.2; 55/421; 55/498; 55/505
[58] Field of Search ........................ 210/172, 436, 210/472, 130, 433.1, 453, 493.2; 55/421, 498, 505

[56] References Cited

U.S. PATENT DOCUMENTS

| 3,288,291 | 11/1966 | Rosaen | 210/90 |
| 4,361,483 | 11/1982 | Pall | 210/445 |

FOREIGN PATENT DOCUMENTS

| 347872 | 12/1989 | European Pat. Off. . | |
| 512639 | 11/1992 | European Pat. Off. . | |
| 2235246 | 2/1974 | Germany . | |
| 3019141 | 7/1981 | Germany . | |
| 3542449 | 4/1987 | Germany . | |
| 8714819 | 1/1988 | Germany . | |
| 480432 | 12/1975 | U.S.S.R. | 210/172 |

*Primary Examiner*—Matthew O. Savage
*Attorney, Agent, or Firm*—Shenier & O'Connor

[57] ABSTRACT

A return filter for hydraulic fluids comprises a filter head attachable to a container for fluid, a filter pot arranged on one side of the filter head, a cover releasably arranged on the other side of the filter head, a filter element arranged so as to extend continuously through the filter head and the filter pot, at least one inlet formed on the filter head for the returning fluid, an air port formed on the filter head, and a ventilation filter inserted into this port. Filter head, filter pot and filter cover consist of plastic; a hose nipple integral with the filter head is formed at the inlet for the returning fluid. The air port is surrounded by a housing which is integral with the filter head and is closable by a cover carrying the ventilation filter. The walls of the housing are provided with slots which are open towards the cover. On the one hand, these slots make provision for air to pass through and, on the other hand, they allow the cover to be releasably clipped into the housing.

9 Claims, 2 Drawing Sheets

5,660,726

RETURN FILTER FOR FLUIDS

BACKGROUND OF THE INVENTION

1. Field of the Invention

The invention relates to a return filter for fluids, in particular, hydraulic fluid.

2. The Prior Art

Such return filters (DE-22 35 246 C3) have been in use for a long time for the filtration of hydraulic fluids, in particular, hydraulic oils. Disadvantages of these return filters are, firstly, that they consist of metal and their manufacture, therefore, involves considerable effort and expense, secondly, that connection lines for the returning fluid, bore holes and elaborate, threaded inserts for reception of the return line have to be provided in the filter head, and, thirdly, that the design of the ventilation holes of these filters is complicated and expensive, as such ventilation holes have an essentially circular-cylindrical connection piece arranged in the filter head which is usually closed by a cover of larger diameter than that of the connection piece, which produces between cover and connection piece an annular gap for the passage of air therethrough. The cover is held on the connection piece by a wire bracket. It can also prove disadvantageous that in return filters used in the open air, rain water, for example, or cleaning liquids or the like can penetrate through the annular gap which is open on all sides into the ventilation filter of the return filter and cause contamination of the ventilation filter or the filtered hydraulic fluid.

SUMMARY OF THE INVENTION

The object of the invention is to eliminate the aforementioned disadvantages and to create a return filter for fluids, in particular, hydraulic fluid, which can manufactured easily and at reasonable cost and which is easy to handle. In particular, the return filter should be light in weight and easy to integrate into existing liquid circuits.

The object is accomplished in a generic return filter for fluids by having a hose nipple integrally formed with the filter head to provide an inlet for returning fluid. The vent cover supports a ventilation filter. Slots formed in the lower wall of the vent housing open in the direction of the vent cover. The slots allow air to enter the vent opening with the vent cover being releasably clipped to the slots.

A particular advantage of this solution is that the filter head, the filter pot or casing and the filter cover consist of plastic. This simplifies manufacture in comparison with known return filters made of metal and reduces the manufacturing costs considerably.

It is also particularly advantageous that both the hose nipple and the housing for the ventilation hole are designed as integral parts of the filter head so that both can be manufactured together with the filter head and, therefore, no additional steps, no additional material and, consequently, also no additional costs are required for their manufacture.

From German Utility Model 87 14 819, it is known, in principle, in another filter assembly, to make the filter head, the filter pot and the filter cover of plastic. DE 30 19 141 shows in a filter, again, of a different type, a hose nipple for connecting a return line. Finally, a filter for fluids wherein a further connection is provided for connecting, for example, a manometer is described in DE 35 42 449 C1.

A filter assembly wherein connection pieces are closable by closure caps is known from U.S. Pat. No. 4,361,483.

BRIEF DESCRIPTION OF THE DRAWINGS

The following description of preferred embodiments of the invention serves to explain the invention in greater detail in conjunction with the attached drawings, in which:

FIG. 4 is a sectional representation of a filter head taken along line IV—IV in FIG. 3.

DESCRIPTION OF THE PREFERRED EMBODIMENTS

Figure 1:
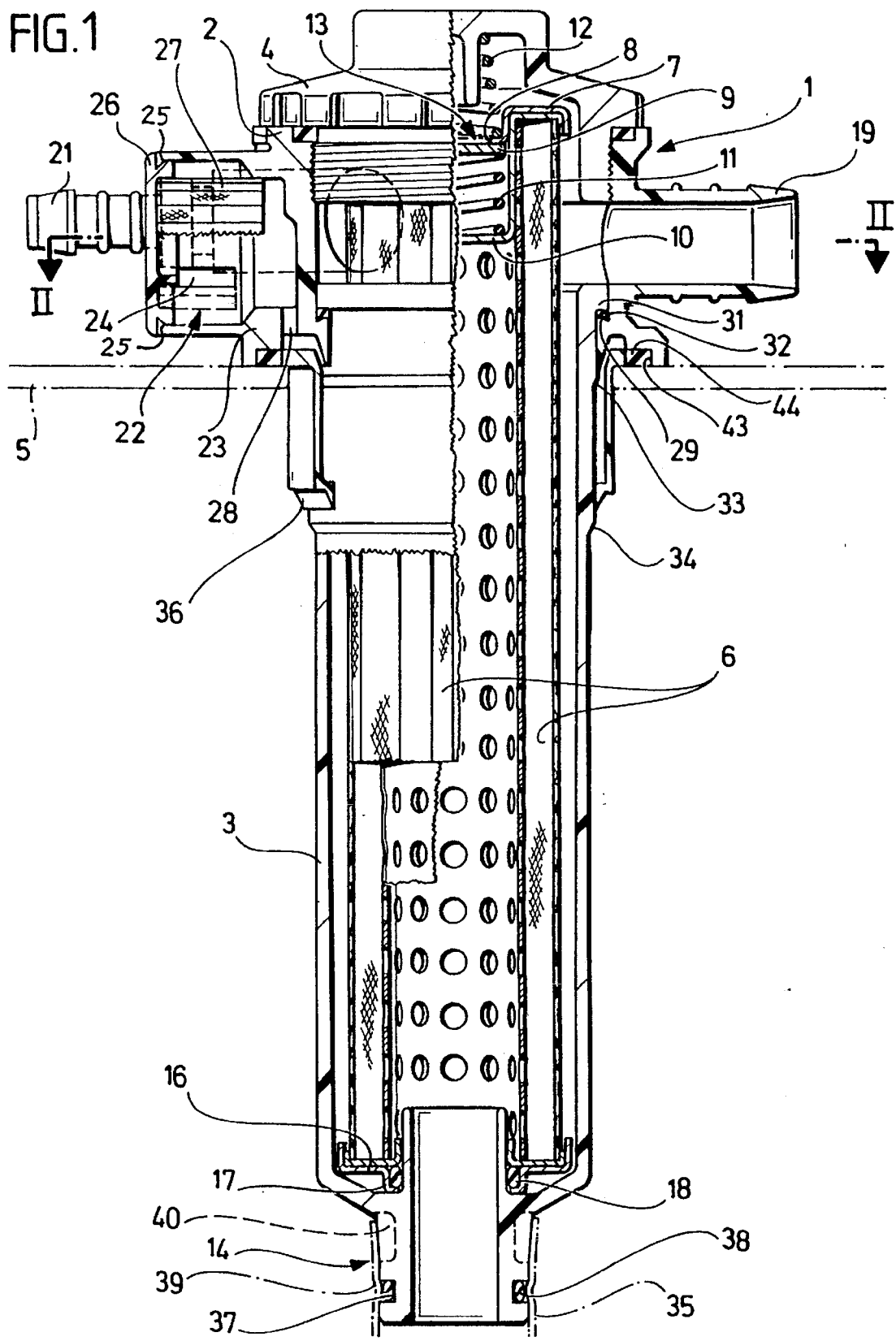
FIG. 1 is a partly sectional side view of a return filter for fluids.

As shown in FIG. 1, a return filter 1 for fluids comprises an essentially circular-cylindrical filter head 2 with a likewise circular-cylindrical filter pot 3 arranged on one side thereof. At its free end facing away from the filter head 2, the filter pot is of conical configuration and leads into an outlet connection piece 14 protruding from the filter pot 3. On the other side of the filter head 2, a cover 4 is releasably connected to the filter head 2 by being screwed onto it. The return filter 1 is secured in the opening of a horizontal wall 5 of a container for hydraulic fluid. Both the filter head 2 and the filter pot 3 and the cover 4 consist of plastic.

A filter element 6 known per se is arranged so as to extend continuously through the filter head 2 and the filter pot 3. At its upper end face facing the cover 4, the filter element 6 is adhesively joined to an annular metal sheet 7 which surrounds the upper end face of the filter element 6. The annular metal sheet 7 has a central, circular opening 8 which is closable from below by a circular disk 9. The disk 9 is pressed by the force of a helical spring 11 held by a sheet metal bracket 10 in the direction of the cover 4—upwards in FIG. 1—so that it normally closes the opening 8. A conical helical spring 12 arranged between the cover 4 and the annular metal sheet 7 clamps the annular metal sheet 7 together with the filter element 6 away from the cover 4 into the interior of the filter pot 3. The annular metal sheet 7 with its central opening 8 and the disk 9 pressed by the spring 11 against the opening 8 cooperate as a by-pass valve 13. The by-pass valve 13 opens, for example, when the hydraulic oil to be filtered has a high viscosity in the cold state and has to be conducted past the filter element 6 in order to avoid damage to it. In this case, the flow of hydraulic oil does not go through the filter element 6, but past it through the by-pass valve 13 directly to the outlet connection piece 14.

At its other end face facing away from the cover 4 and facing the outlet connection piece 14, the filter element 6 is adhesively joined to a further annular metal sheet 16 which surrounds an extension of the outlet connection piece 14 extending into the filter pot 3. There is formed on the side of the annular metal sheet 16 facing away from the filter element 6 a metal sheet which is also annular and protrudes at right angles from the metal sheet 16. It is bent at a right angle towards the extension of the outlet connection piece 14. extending into the filter pot 3 and serves to accommodate an annular seal 18. The annular metal sheet 16, the metal sheet 17 and the annular seal 18 form a seal of the filter element 6 with the extension of the outlet connection piece 14 extending into the filter pot 3 and the filter element 6.

Figure 2:
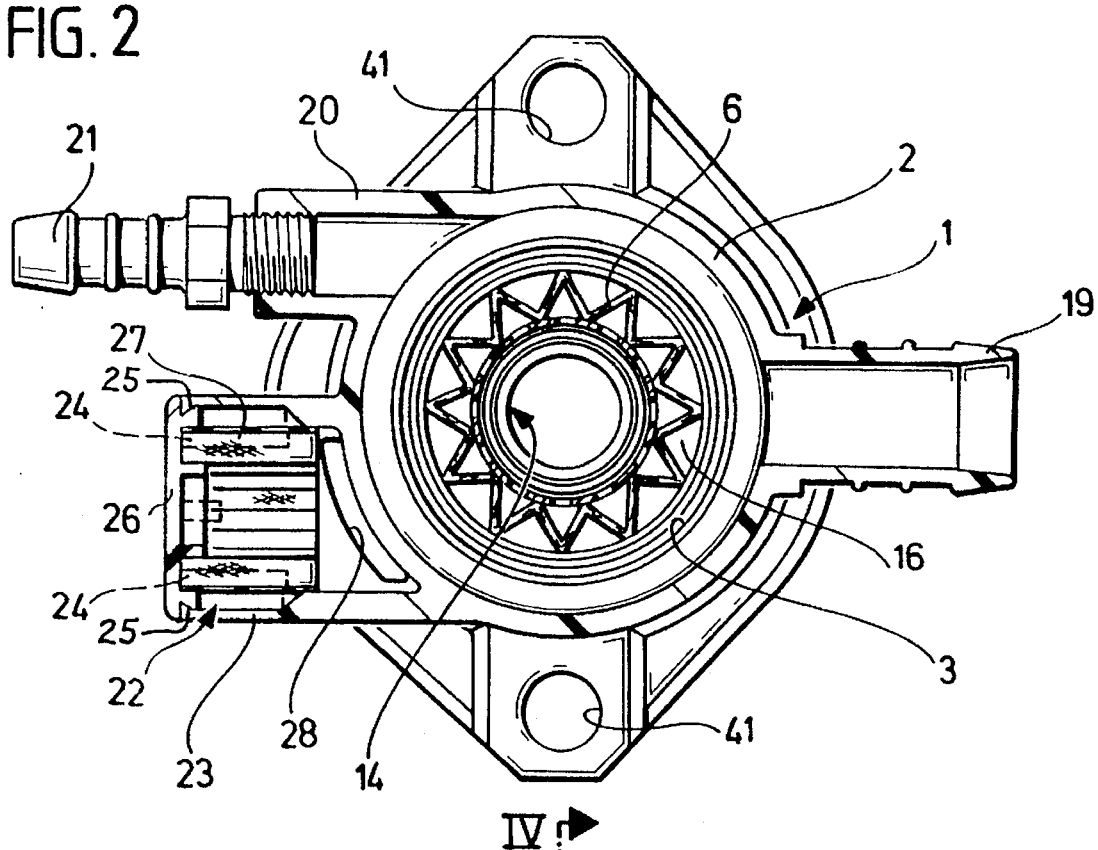
FIG. 2 is a partly sectional representation of a filter head taken along line 2—2 in FIG. 1.

A hose is pushed onto and attached by a clip or the like, known per se, to a hose nipple 19 for returning hydraulic fluid which is integrally arranged on the filter head 2. As the filter head 2 consists of plastic, the hose nipple 19 integrally formed on it can be inexpensively manufactured with it without any additional expenditure, and there are no problems with the tightness of the line for the returning hydraulic fluid which is connected to the filter head 2. The line for the returning hydraulic fluid is also easy to attach in the form of a hose on the hose nipple 19. In comparison with the known screw-in hose connections, such attachment of the line for the returning fluid has, in particular, the advantage of being quick to assemble. As shown in FIG. 2, there is formed on the filter head 2 a connection piece 20 for selective reception of a further hose nipple 21 onto which a further oil return line can be pushed in the form of a hose. Instead of the hose nipple 21, a manometer, not illustrated, for monitoring the return pressure of the hydraulic fluid and hence the contamination of the element can be inserted into the connection piece 20 which is initially closed during manufacture of the plastic filter head 2.

Figure 3:
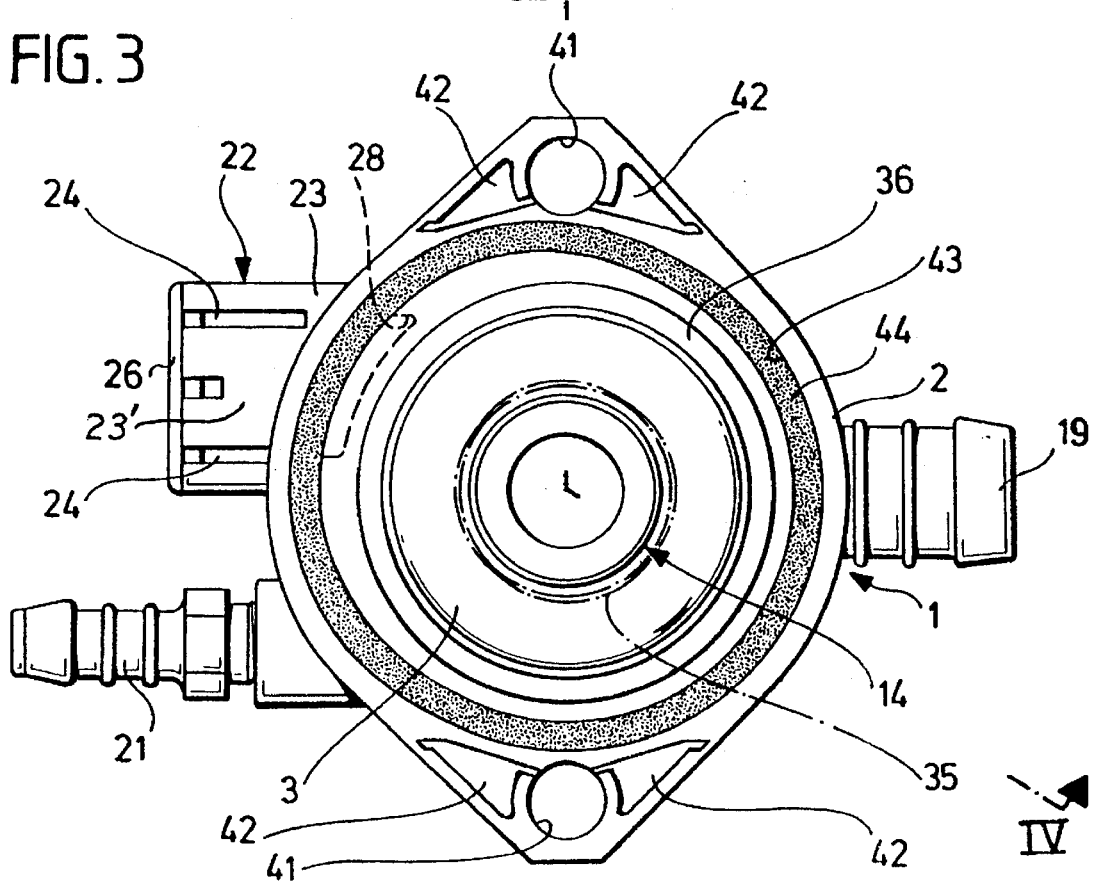
FIG. 3 is a bottom view of a filter head.

As shown, in particular, in FIGS. 1 and 2, an air port 22 is provided on the filter head 2 and surrounded by a housing 23, integral with the filter head 2. Slots 24 which are only open in the downward direction are provided in the walls of the housing 23 and lead to a cover 26 (see FIGS. 2 and 3) which closes the end face of the port 22. On the one hand, the slots 24 are connected to the air port 22. The slots 24 define a flexible cantilever beam portion 23' of the lower wall of the housing. The vent cover 26 and the housing 23 include securing means 25 cooperating with the flexible cantilever beam portion for enabling the vent cover to be releasably clipped into the housing 23, thereby making additional securing elements for the cover superfluous (FIG. 3). A ventilation filter 27 folded in the shape of a star is adhesively joined in a cantilever manner at one end face thereof to the cover 26. The ventilation filter 27 which preferably consists of paper prevents dirt particles from penetrating into the return filter 1 and contaminating the hydraulic fluid.

As shown in FIGS. 1, 2 and 3, a ventilation slot 28 arranged in the circumferential direction in the filter head 2 and connected to the air port 22 allows air to pass into the interior of the return filter 1 or in the reverse direction. The slots 24 are only open in the downward direction (see FIG. 1) so that if the return filter is used in the open air, rain water and liquid cleaning agent used during cleaning cannot enter through the port 22.

As shown, in particular, in FIGS. 1 and 4, an annular, circumferential sealing edge 29 is formed on the inner circumferential surface of the filter head 2 and a projection 31 of complementary design is located opposite it on the filter pot 3. To seal the filter head 2 against the filter pot 3, an annular seal 32 is arranged in a space formed between the sealing edge 29 and the projection 31.

As shown in FIG. 1, the filter pot 3 comprises three axially adjacent regions whose diameters are graduated relative to one another, the diameter of the region arranged closest to the outlet connection piece 14 being smallest and the diameter of the region arranged furthest from the outlet connection piece being largest. When the filter is assembled, a first step 33 of the filter pot 2 is adjacent to the opening in the wall 5 of the container for the fluid. A second step 34 is adjacent to an oil wiper 36 surrounding the filter pot 3.

The stepped cross-sectional shape of the filter pot 3 enables easy removal from the filter head 2. This is particularly advantageous when the plastic material of the filter pot 3 flows somewhat in the course of time and causes an increase in the size of the diameter of the filter pot 3.

Removal of the entire filter pot 3 is particularly advantageous because after removal of the filter element 6, the interior of the filter pot 3 can first be thoroughly cleaned before a new filter element 6 is inserted into the filter pot 3. In particular, hydraulic oil which is already contaminated is thereby prevented from getting back into the container for the hydraulic fluid.

A pipe extension whose length and shape are adaptable to different sizes of different containers for fluid is provided at the free end of the filter pot 3 facing away from the filter head 2. The pipe extension consists of a metal pipe 35 which is pushed onto the outlet connection piece 14 of the filter pot 3 and dips with its free end into the hydraulic fluid. The outlet connection piece 14 has an annular groove 37 extending in the circumferential direction into which an annular seal 38 is placed. In the region of the annular seal 38, a radially inwardly protruding bead 39 is subsequently produced on the metal pipe 35 which is pushed onto the outlet connection piece. The bead 39 extends somewhat into the annular groove 37 and, on the one hand, together with the annular groove 37 and the annular seal 38, seals the metal pipe 35 against the outlet connection piece 14, and, on the other hand, holds the metal pipe 35 firmly on the outlet connection piece 14. Owing to the bead 39 being produced subsequently, the metal pipe 35 can first be pushed easily over the annular seal 38.

On the outer circumference of the outlet connection piece 14, webs 40 are distributed symmetrically over the circumference between the annular groove 37 and the wall of the filter pot 3 and extend in such conical configuration that the outer diameter of the outlet connection piece 14 continually decreases in the direction of the annular groove 37. Owing to the conical shape of these webs, the metal pipe 35 is widened in the direction of the filter head 2 when pushed onto the outlet connection piece 14, whereby the metal pipe 38 is seated in a firm, play-free and, after production of the bead 39, also tight manner on the outlet connection piece 14.

As shown in FIGS. 2 and 3, screw-on eyelets 41 for connecting the return filter 1 to the wall 5 of the container for the fluid are integrally provided on the filter head 2. These are elastically deformable in order to avoid transmission of tension to the filter head 2, which can lead to deformation of the filter head 2 and, consequently, to leaks. To this end, materially reduced areas 42 are provided in the region of the screw-on eyelets 41 (FIGS. 3 and 4). The elastic deformability of the screw-on eyelets 41 enabled by the materially reduced areas prevents misalignment of the entire filter head 2 when the filter head 2 is unevenly screwed onto the container for fluid and thereby ensures that the cover 4 can be easily screwed in and out again.

As shown in FIGS. 1 and 3, there is placed in an almost circular groove 43 provided in the filter head 2 an annular seal 44 which serves to seal the filter head 2 against the wall 5 of the container for the fluid.

Having thus described my invention, what I claim is:

1. A return filter for filtering hydraulic fluid including in combination a flexible plastic filter head having an upper portion and a lower portion, a hose nipple integrally formed with said filter head to provide an inlet for returning fluid, a plastic filter casing disposed on the lower portion of said filter head, a plastic filter cover releasably connected to the upper portion of said filter head, and a filter element extending from said filter head into said filter casing, a flexible plastic housing integrally formed with said filter head and having a lower wall and a hollow interior defining a vent opening, a vent cover for said housing and a ventilation filter supported on said vent cover for placement within the vent opening, wherein said housing includes a pair of slots within said lower wall opening toward said vent cover, the slots allowing air to enter the vent opening, wherein the slots define a flexible cantilever beam portion of the lower wall of the housing, and wherein said vent cover and the housing include securing means cooperating with said flexible cantilever beam portion for enabling said vent cover to be releasably clipped to the housing.

2. A filter as in claim 1, further including ribs integrally formed with said filter head and provided with a bolt-receiving aperture, said ribs having portions of reduced cross-sectional areas.

3. A filter as in claim 1, wherein said filter casing has a stepped cross-sectional shape for facilitating removal from said filter head.

4. A filter as in claim 1, including means integrally formed with said filter head for sealing said filter head to said filter casing.

5. A filter as in claim 1, further including means for biasing said filter element into said filter casing away from said filter cover.

6. A filter as in claim 1, further including means comprising a relief valve for bypassing said filter element.

7. A filter as in claim 1, further including a second hose nipple integrally formed with said filter head.

8. A filter as in claim 1, further including an outlet protruding downwardly from said filter casing and having an annular groove provided with a seal, and a metal pipe extension attached to said outlet and provided with an indentation extending radially toward said annular seal.

9. A filter as in claim 1, wherein said ventilation filter has a star-shaped configuration and an end face which is adhesively joined to said vent cover with said ventilation filter extending outwardly therefrom.

* * * * *